United States Patent [19]

Stauffer

[11] 4,384,210
[45] May 17, 1983

[54] SPATIAL LOW PASS FILTER FOR RANGE FINDING SYSTEMS

[75] Inventor: Norman L. Stauffer, Englewood, Colo.

[73] Assignee: Honeywell Inc., Minneapolis, Minn.

[21] Appl. No.: 232,106

[22] Filed: Feb. 6, 1981

[51] Int. Cl.³ .............................................. G02B 5/18
[52] U.S. Cl. .............................. 250/550; 350/162.17; 350/162.20
[58] Field of Search ............................. 250/550, 205; 350/162.17, 162.20

[56] References Cited

U.S. PATENT DOCUMENTS 4,195,909  4/1980  Holle et al. ..................... 350/162.17

Primary Examiner—David C. Nelms
Assistant Examiner—Darwin R. Hostetter
Attorney, Agent, or Firm—Charles J. Ungemach

[57] ABSTRACT

A low pass filter for an auto focus camera system to deflect light from the main lens by a controlled angular amount and thus suppress high frequency components in the signal.

15 Claims, 6 Drawing Figures

SPATIAL LOW PASS FILTER FOR RANGE FINDING SYSTEMS

BACKGROUND OF THE INVENTION

In my U.S. Pat. No. 4,185,191, issued Jan. 22, 1980 and assigned to the assignee of the present invention, I describe a system for use in determining range to an object utilizing a plurality of radiation responsive detectors such as charge-coupled devices arranged in pairs behind a plurality of lenslets which receive radiation from a remote object through the primary lens of the system such as the taking lens of a camera.

A number of improvements and modifications to this system may be found in the following copending applications: Ser. No. 16,595, filed Sept. 22, 1980, now U.S. Pat. No. 4,249,073, issued Mar. 2, 1981 by Norman L. Stauffer, Ser. No. 58,964, filed Sept. 26, 1980, now U.S. Pat. No. 4,250,376, issued Feb. 10, 1981 by James D. Joseph, Ser. No. 74,845, filed Oct. 14, 1980, now U.S. Pat. No. 4,254,330, issued Mar. 3, 1981 by Norman L. Stauffer et al, Ser. No. 85,821, filed Oct. 17, 1979 by Norman L. Stauffer, Ser. No. 99,235, filed Sept. 26, 1980, now U.S. Pat. No. 4,250,377, issued Feb. 10, 1981 by Dennis J. Wilwerding, and Ser. No. 168,225, filed July 10, 1980 by Richard Langlais et al and all assigned to the assignee of the present invention.

In one of the above-mentioned improvements, copending application Ser. No. 74,845, now U.S. Pat. No. 4,254,330 a system is disclosed which overcomes a problem that occurs when the scene being viewed contains high frequency components. This problem may occur, for example, in viewing a complex subject containing fine detail. More particularly, when high frequency components exist in the scene being viewed, the range finding or auto focus system may be fooled into establishing a focus position other than the proper one or may cause the operation of the system to be unpredictable. This copending patent application overcomes the problem by enhancing the low frequency components of the signal with apparatus which takes the sums of the outputs of groups of detectors in first and second pluralities of detectors so that the individual fluctuations in individual detectors are smoothed. While this system operates satisfactorily to avoid the problem described in high frequency scenes, the solution requires complex electronic components which are more costly and difficult to fabricate than is desired.

SUMMARY OF THE INVENTION

The present invention overcomes the problem of high frequency components in a scene by providing a low pass optical filter between the main system lens and the lenslets and sensors of the range determination apparatus. More specifically, an optical filter is used which deflects light from the main lens by a controlled angular amount thereby causing the light that would normally strike one lenslet to now illuminate two or possibly three lenslets. By this means, the high frequency components in the signal coming from the main lens become blurred or suppressed while the low frequency components, although also deflected, still provide a gradient for the detectors to sense and provide a signal for the electronic circuitry to use in determining range.

DETAILED DESCRIPTION OF THE PREFERRED EMBODIMENTS

Figure 1:
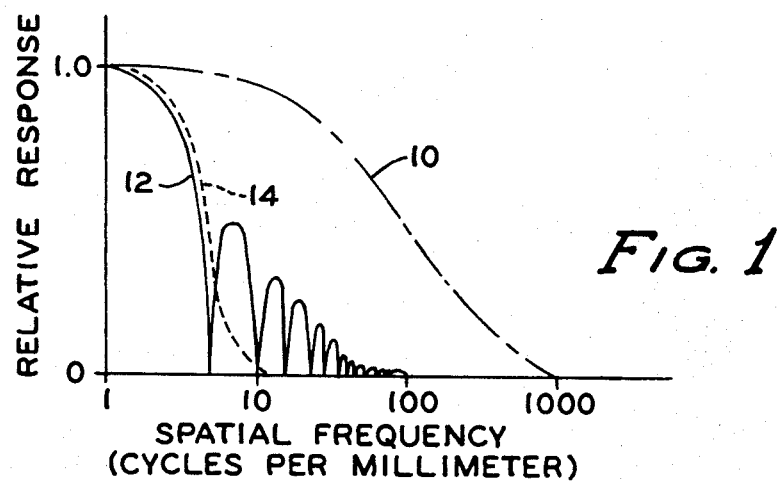
FIG. 1 shows a graph of the response of a range finding system with respect to the spatial frequency in the optical scene.

FIG. 1 is a graph showing the relative response of the elements of the auto focus system along the coordinate axis plotted against the spatial frequencies which may exist in the light coming from the scene being viewed along the abscissa in cycles per millimeter. The dash-dot line curve 10 represents the transfer function of the main lens of the system which is normally the taking lens of a camera and it is seen that the taking lens can accommodate frequencies up to nearly a thousand cycles per millimeter although its greatest response is in the area between one cycle and about 50 cycles per millimeter.

The solid line curve 12 represents the response of the auto focus system including the detectors which receive light from the remote subject and the electronics which determine the range to the remote object. It is seen that the response of the system is greatest between about one cycle and about 2.5 cycles per millimeter and falls off to substantially zero at about 5.0 cycles per millimeter then rebounds again between 5.0 cycles per millimeter and about 10 cycles per millimeter and keeps rebounding with decreasing amplitudes up to about 100 cycles per millimeter. It is desirable to keep the spatial frequency reaching the detectors down below about 5.0 cycles per millimeter so that the system can have the greatest response. While a filter which eliminated all frequencies above 5.0 cycles per millimeter would be the best, simple filters cannot be made which have such sharp cutoff abilities.

The dashed curve 14 shows an approximate "desirable" transfer function for a filter available with present technology and it is seen that such a filter could approximate the shape of curve 12 down to about 5.0 cycles per millimeter and thereafter trail off to zero at about 10 cycles per millimeter. With such a filter, the spatial frequency in the scene being viewed would be limited to the area most of which would correspond to greatest response of the range finding equipment. As mentioned, curve 14 should desirably go to zero at about 5.0 cycles per millimeter, but filters with such characteristics are not capable of being produced at the present time. The filter used in the present invention will, nevertheless, provide considerably better performance than prior art systems employing no filtering at all.

Figure 2:
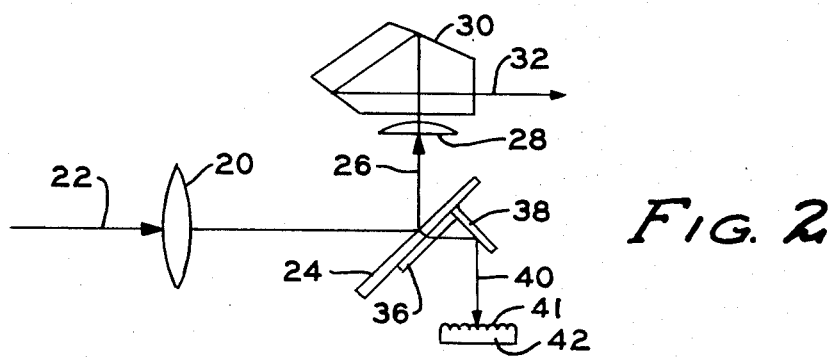
FIG. 2 shows a schematic representation of a camera including a camera lens, a beam splitter, the filter used in the present invention and the sensor array used for determining range.

FIG. 2 shows a schematic representation of a camera system wherein a filter of the present invention is employed. In FIG. 2, the taking lens 20 of a camera is seen receiving radiation from a remote scene along a path identified by arrow 22 and transmitting such light to a beam splitter 24 where it is split into two paths. The first of these paths is shown by arrow 26 extending upwardly through a lens 28 and into a prism 30 where it is internally reflected and emerges along an arrow 32 to the eye piece of the viewer. The second path is through the beam splitter 24 and through a low pass filter 36 of the present invention through which it strikes a mirror 38 and travels downwardly along arrow 40 to the lenslets 41 and the detector array 42 of the auto focus system. As will be explained, filter 36 operates to deflect the light passing therethrough in a controlled angular direction so that a ray of light instead of hitting merely one lenslet will be diffused to strike two or possibly three lenslets. The filter should be placed behind the beam splitter as is the case in FIG. 2 so that it will not affect the path of light to the view finder and must be out of the way when the picture is taken so as not to affect the light to the film. It must, however, be placed so that it will influence light going through to the sensor module when range finding is being accomplished. Furthermore, the filter should not be placed too near the sensor module since it will then have decreased filtering action and will cause too great a distortion of the camera lens exit pupil which must be imaged by the lenslets. Mounting the filter on the beam splitter, which swings out of the way during the picture taking sequence, places it at an advantageous position. The beam splitter 24 itself may be constructed to act as a filter and other alternate locations are possible as, for example, on the mirror 38.

Figure 3A:
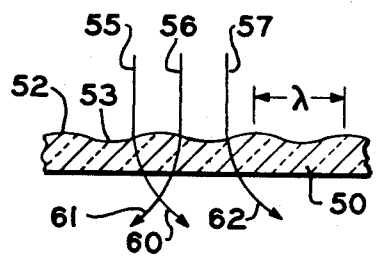
FIGS. 3A–3D show alternate suggested cross sections for the spatial low pass filter used in the present invention.

FIGS. 3A, 3B, 3C and 3D show cross sectional views of possible filters which would operate to suppress the high frequency components in the scene being viewed. In FIG. 3A, a filter 50 is shown having a plane lower surface and the upper surface formed as a wave having peaks such as 52 and valleys such as 53. The distance between two successive peaks is shown as "λ", a wavelength which should not be so large that the light is not uniformly treated (i.e.,; above about one millimeter). Three paths of light 55, 56 and 57 are shown in FIG. 3A and their path emerging through the filter is shown by arrows 60, 61 and 62 respectively leaving the flat under surface at an angle thereto. This angle is shown larger than would normally be the case for purposes of clarity and, in practice, is chosen so that it will tend to strike one lenslet on either side of the lenslet which would be struck if the filter were not present. If the distance between the filter and the sensor module is about 20 millimeters, then an angle of 20 milliradians will illuminate three lenslets, the main one and two at 200 microns on either side of the middle lenslet. The waveform shown on the upper surface of filter 50 could also be placed on the lower surface or both surfaces could have a wave like surface.

Figure 3B:
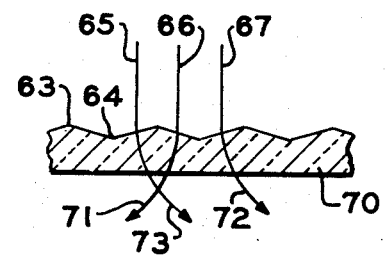

In FIG. 3B, a filter 70 is shown having a flat under surface and an upper surface characterized by a triangular wave shape having peaks such as at 63 and valleys such as at 64. Again, three light rays 65, 66 and 67 are shown being bent through the filter 70 so as to emerge along paths shown by arrows 73, 71 and 72 respectively. Again the angle has been exaggerated for clarity in FIG. 3B and should, like in FIG. 3A, be chosen so that about three lenslets are illuminated. Likewise, as with respect to FIG. 3A, the sawtooth type upper surface could be on the lower surface or both surfaces could be made in the shape shown.

Figure 3C:
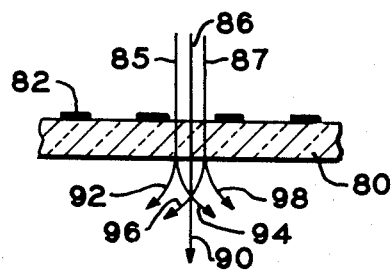

FIG. 3C shows a filter 80 having a plurality of areas such as 82 operative to block light entirely and the filter acts much like a diffraction grating causing the three light beams shown as 85, 86 and 87 to emerge along paths shown by arrows 90, 92, 94, 96 and 98. A disadvantage which accompanies the apparatus of FIG. 3C is that some loss of light is accomplished which of course affects the available light to the sensor and would be less desirable under low light conditions than the filters of FIGS. 3A and 3B.

Figure 3D:
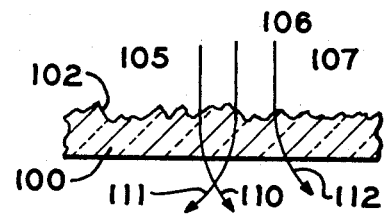

In FIG. 3D, a filter 100 is shown having a relatively flat under surface and a more or less random irregular upper surface 102. The random irregularity of the surface 102 should not be so great as to cause a complete scattering of the light passing therethrough but rather should be, as shown, one which affects the light rays 105, 106 and 107 in a manner similar to that of FIGS. 3A and 3B with the light emerging along paths shown by arrows 110, 111 and 112 at fairly small angles (20 milliradians or less) to the perpendicular. One possible way of creating a controlled random surface might be to etch the surface with an acid that acts on the surface in different ways at different points, and control the time of etching until the desired surface is generated. While, in FIG. 3D, the emerging light is not as accurately positioned for angular deflection as that of FIGS. 3A and 3B, it has the advantage of preventing any undesirable affects that might be caused by the regular periodic nature of the filters of FIGS. 3A and 3B. As with FIGS. 3A and 3B, the lower surface could be made irregular or both surfaces could be made irregular and still accomplish the desired filtering of the high frequency components in the light passing therethrough.

A further modification to FIGS. 3A and 3B (not shown) might be to produce a filter out of narrow segments having the cross sections shown in FIGS. 3A and 3B but offsetting them with respect to one another so that periodic effects would balance out or to use segments having different wavelengths entirely so as to prevent any uniform diffraction patterning.

It is therefore seen that I have provided a filter for use in a range finding system of the type employing detector pair lenslet combinations which will tend to filter out or suppress high frequency components in the scene being viewed and thus permit the range finding equipment to better respond to the low frequency components and reduce the chance of erratic operation or of indicating a false proper focus position. Many modifications and improvements will occur to those skilled in the art and I do not wish to be limited to the specific disclosures used in connection with the description of the preferred embodiments. I intend only to be limited by the following claims.

The embodiments of the invention in which an exclusive property or right is claimed are defined as follows:

1. Apparatus for use in a range determination system having a primary lens for directing radiation from a remote object along a path to radiation responsive means operable in accordance with the distribution of the radiation to determine the range to the object, the radiation distribution containing high spatial frequency components which may cause undesirable operation of the system comprising:

radiation filter means mounted in the path and operable to suppress the high spatial frequency components.

2. Apparatus according to claim 1 wherein the filter has an uneven surface which causes the radiation to deflect at a predetermined angle to the path.

3. Apparatus according to claim 2 wherein the uneven surface is a plurality of evenly spaced peaks and valleys and the distance between two adjacent peaks is below about 1.0 millimeters.

4. Apparatus according to claim 2 wherein the uneven surface is a diffraction grating.

5. Apparatus according to claim 2 wherein the uneven surface is a controlled irregular surface.

6. Apparatus according to claim 3 wherein the peaks and valleys are made in segments having different wavelengths.

7. Apparatus for use in a camera auto focus system having a primary lens for directing radiation from a remote object along a path through a beam splitter to a mirror for reflection to a plurality of lenslets each operable to produce an image of the exit pupil of the primary lens on a pair of detectors located behind each lenslet, the radiation containing high spatial frequency components which may cause undesirable operation of the system, comprising:

radiation filter means mounted in the path and operable to suppress the high spatial frequency components.

8. Apparatus according to claim 7 wherein the radiation filter means is mounted between the beam splitter and the mirror.

9. Apparatus according to claim 7 wherein the radiation filter is formed as a part of the beam splitter.

10. Apparatus according to claim 7 wherein the filter operates to deflect the radiation passing therethrough by an amount necessary to cause the radiation normally falling on one of the lenslets to also fall on the two lenslets adjacent to the one of the lenslets.

11. Apparatus according to claim 10 wherein the filter has a surface composed of alternate evenly spaced peaks and valleys.

12. Apparatus according to claim 11 wherein the space between two adjacent peaks is below about 1.0 millimeters.

13. Apparatus according to claim 10 wherein the filter is a diffraction grating.

14. Apparatus according to claim 10 wherein the filter has a controlled irregular surface.

15. Apparatus according to claim 10 wherein the filter is made of narrow segments having different wavelengths.

* * * * *

Notice of Adverse Decision in Interference

In Interference No. 101,269, involving Patent No. 4,384,210, N. L. Stauffer, SPATIAL LOW PASS FILTER FOR RANGE FINDING SYSTEMS, final judgment adverse to the patentee was rendered July 9, 1986, as to claims 7, 8, 9, 10, 14 & 15.

[*Official Gazette October 7, 1986.*]